United States Patent
Sathe et al.

(10) Patent No.: US 7,928,993 B2
(45) Date of Patent: Apr. 19, 2011

(54) REAL-TIME MULTI-RESOLUTION 3D COLLISION DETECTION USING CUBE-MAPS

(75) Inventors: Rahul P. Sathe, Folsom, CA (US); Adam T. Lake, Portland, OR (US)

(73) Assignee: Intel Corporation, Santa Clara, CA (US)

(*) Notice: Subject to any disclaimer, the term of this patent is extended or adjusted under 35 U.S.C. 154(b) by 599 days.

(21) Appl. No.: 11/495,366

(22) Filed: Jul. 28, 2006

(65) Prior Publication Data
US 2008/0024491 A1    Jan. 31, 2008

(51) Int. Cl.
G09G 5/00    (2006.01)
G06T 15/00    (2011.01)

(52) U.S. Cl. .................. 345/619; 345/419; 345/958

(58) Field of Classification Search .................. None
See application file for complete search history.

(56) References Cited

U.S. PATENT DOCUMENTS

| | | | |
|---|---|---|---|
| 6,396,492 B1* | 5/2002 | Frisken et al. | 345/420 |
| 6,498,607 B1 | 12/2002 | Pfister et al. | |
| 6,559,853 B1 | 5/2003 | Hashimoto et al. | |
| 6,798,415 B2 | 9/2004 | Lake et al. | |
| 7,065,242 B2 | 6/2006 | Petrov et al. | |
| 2002/0060685 A1* | 5/2002 | Handley et al. | 345/582 |
| 2004/0108999 A1 | 6/2004 | Martin | |
| 2006/0066505 A1* | 3/2006 | Nishimura | 345/2.3 |
| 2007/0052724 A1* | 3/2007 | Graham et al. | 345/620 |

OTHER PUBLICATIONS

Masafumi Takahashi and Kazunori Miyata, GPU based interactive displacement mapping, IWAIT, Jan. 2005, Session PS 4 Computer Graphics and Animation, pp. 477-480.*
Wong, W. S. and Baciu, G. 2005. GPU-based intrinsic collision detection for deformable surfaces: Collision Detection and Deformable Objects. Comput. Animat. Virtual Worlds 16, 3-4 (Jul. 2005).*
Kolb, A., Latta, L., and Rezk-Salama, C. 2004. Hardware-based simulation and collision detection for large particle systems. In Proceedings of the ACM SIGGRAPH/EUROGRAPHICS Conference on Graphics Hardware (Grenoble, France, Aug. 29-30, 2004). HWWS '04. ACM, New York, NY.*
Jimenez, J.J., Segura, R.J., Feito, F.R.: Efficient Collision Detection between 2D Polygons. Journal of WSCG, vol. 12, No. 1-3, ISSN 1213-6972 WSCG'2004, Feb. 2-6, 2003, Plzen, Czech Republic.*

* cited by examiner

*Primary Examiner* — Daniel F Hajnik
(74) *Attorney, Agent, or Firm* — Trop, Pruner & Hu, P.C.

(57) ABSTRACT

Apparatus, systems and methods for real-time, multi-resolution 3D collision detection using cube maps are disclosed. For example, a method is disclosed including receiving a first polygon, receiving a second polygon and then using a texture map stored in memory to detect collisions between the first and second polygons. Other implementations are also disclosed.

11 Claims, 7 Drawing Sheets

REAL-TIME MULTI-RESOLUTION 3D COLLISION DETECTION USING CUBE-MAPS

BACKGROUND

Collision detection in three-dimensional (3D) graphics is the process of determining whether two objects, typically rigid bodies comprising linked polygons such as triangles, are in contact with each other. Usually this is done by having a processor implement an algorithm to calculate whether a triangle of one object conflicts spatially with a triangle of another object. Although there are a variety of approaches to this problem all standard solutions use the processor to execute calculations including testing for object-to-object collisions using a spatial data structure such as an octree and then undertaking a series of geometric calculations to assess polygon-to-polygon collisions for those objects whose bounding volumes are shown to be intersection candidates.

When implemented in a processor such as a central processing unit (CPU) these traditional approaches to collision detection can occupy significant computing resources that, particularly in a 3D gaming context, may be better spent in undertaking CPU-specific tasks such as physics calculations or implementing artificial intelligence routines. Moreover, by implementing collision detection in the CPU rather than a dedicated graphics processor such as a graphical processing unit (GPU) the traditional approaches fail to take advantage of the hardware primitives supported by modern graphics texture sampling hardware.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
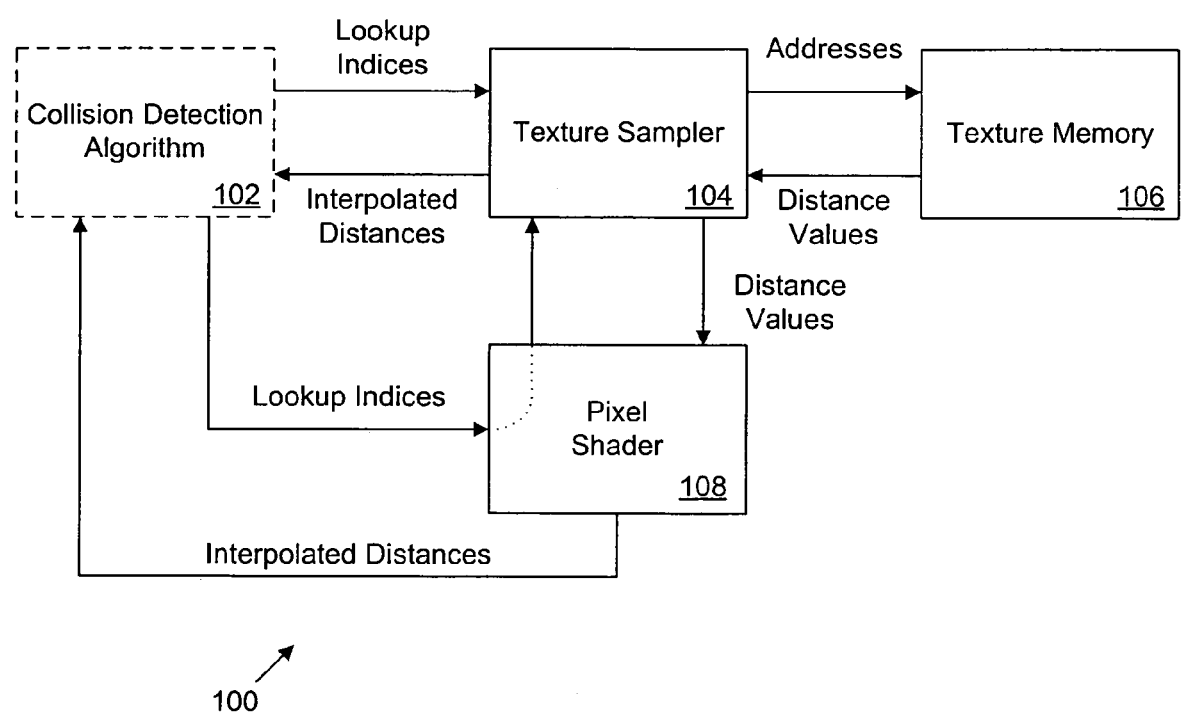
FIG. 1 illustrates portions of a 3D rendering engine or apparatus in accordance with some implementations of the invention.

FIG. 1 is a simplified block diagram of portions of a 3D rendering engine 100 in accordance with some implementations of the claimed invention. Engine 100 includes a collision detection algorithm 102, a texture sampler 104, and texture memory 106. Those skilled in the art may recognize that a 3D rendering engine may comprise other components (e.g., tessellation unit, vertex shader, etc.) that have been excluded from FIG. 1 so as not to obscure implementations of the invention. In addition, although the invention is not limited in this regard, FIG. 1 includes a pixel shader 108 that may be used to couple algorithm 102 to texture sampler 104. Moreover, while FIG. 1 illustrates one texture sampler 104 those skilled in the art will recognize that more than one texture sampler may be implemented and/or coupled to collision detection algorithm 102 and/or memory 106 without departing from the scope and spirit of the claimed invention.

Collision detection algorithm 102 may comprise a detection routine including any combination of software, and/or firmware that may be used to detect collisions between objects. Towards that end, algorithm 102 may provide texture sampler 104 with one or more lookup indices. Alternatively, algorithm 102 may provide shader 108 with one or more lookup indices and shader 108 may convey those indices to texture sampler 104. Sampler 104 may then use those indices to access distance data stored at corresponding texture addresses of a texture map held or stored in texture memory 106 as will be explained in greater detail below. Those skilled in the art will recognize that algorithm 102 may comprise a collision detection kernel spawned by a 3D graphics application (not shown) executing on a computing system that supports engine 100. Alternatively, algorithm 102 may comprise a collision detection kernel spawned by pixel shader 108. Those skilled in the art will further recognize that the terms objects, geometries, polygons, bodies and polyhedrons may be used interchangeably.

Texture sampler 104 may be any texture sampling logic comprising any combination of hardware, software, and/or firmware that is capable of accessing texture data in memory 106 in response to one or more lookup indices provided by algorithm 102. In accordance with implementations of the invention, the texture data stored in memory 106 and accessed by sampler 104 may include a texture map, such as a cube map, comprising an array of pixels (or "texels") storing distance values as will be explained in greater detail below. Sampler 104 may then use the indices provided by algorithm 102 to determine associated texture addresses to be used to access the corresponding distance values stored and/or held in memory 106. Sampler 104 may then use those distance values to generate interpolated distance values and may provide those interpolated distance values to algorithm 102 as will be described in greater detail below. Alternatively, sampler 104 may provide those distance values to shader 108 and shader 108 may generate interpolated distance values and provide those interpolated distance values to algorithm 102.

Texture memory 106 may comprise any memory device or mechanism suitable for storing and/or holding one or more texture maps, such as one or more cube maps, specifying texel data such as distance values. While memory 106 may comprise any volatile or non-volatile memory technology such as Random Access Memory (RAM) memory or Flash memory, the invention is in no way limited by the type of memory employed for use as memory 106.

Figure 2:
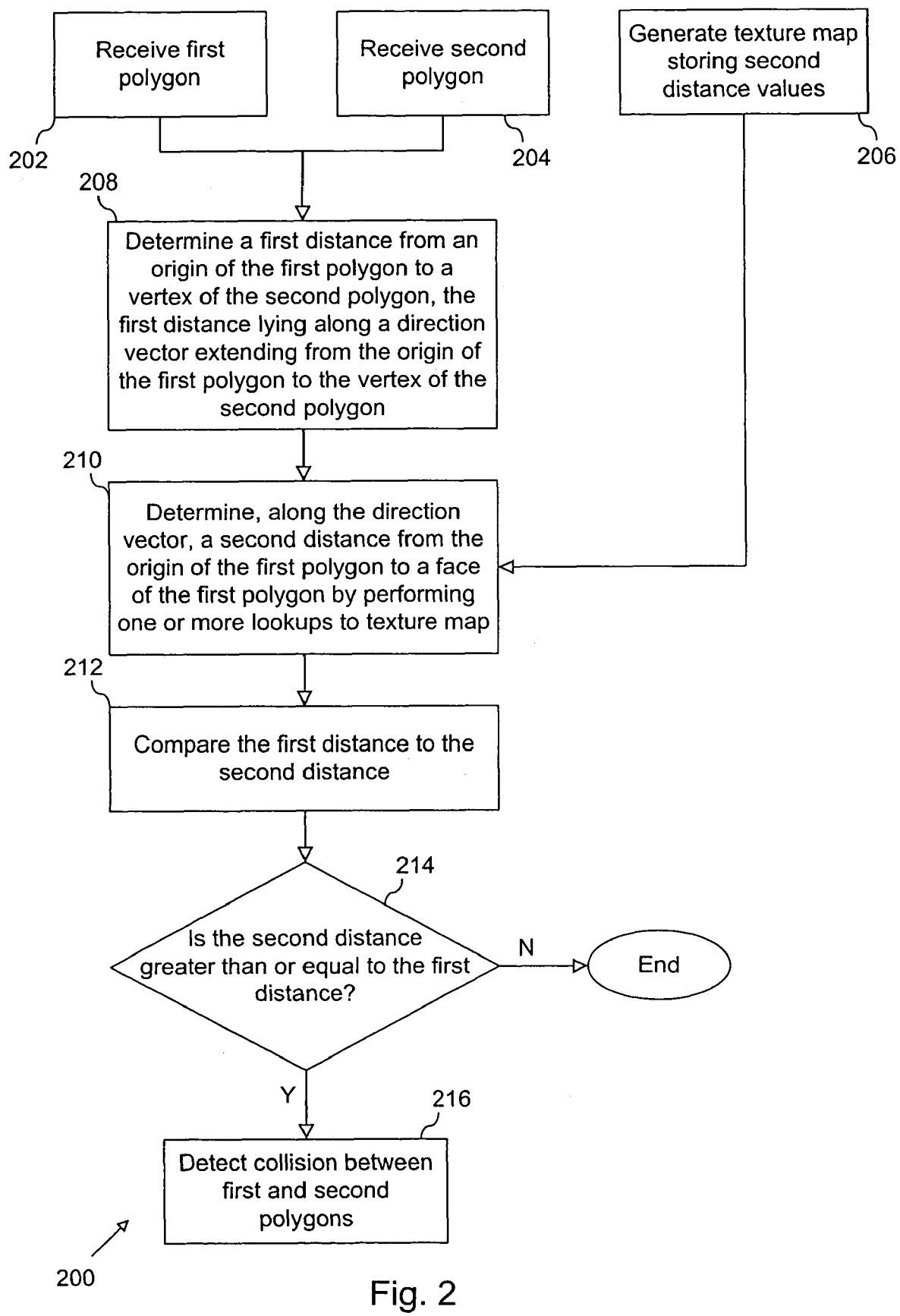
FIG. 2 is a flow chart illustrating a process in accordance with some implementations of the invention.

FIG. 2 is a flow chart illustrating a process 200 in accordance with some implementations of the invention. While, for ease of explanation, process 200 may be described with regard to engine 100 of FIG. 1, the claimed invention is not limited in this regard and other processes or schemes supported by appropriate devices in accordance with the claimed invention are possible.

Process 200 may begin with the receipt of a first polygon [act 202] and the receipt of a second polygon [act 204]. In accordance with some implementations, acts 202 and 204 may, for example, involve collision detection algorithm 102 receiving the vertex coordinates of first and second triangles where those coordinates are defined, for example, with respect to a model coordinate system that may be implemented by a 3D graphics application (now shown). Such a 3D graphics application may spawn algorithm 102 and may supply algorithm 102 with geometric primitives, such as triangles.

Those skilled in the art may recognize that, as part of an overall collision detection process, algorithm 102 may have, prior to acts 202 and 204, already subjected 3D graphical objects to a trivial reject phase using a spatial data structure such as an octree or a kd-tree. In doing so, algorithm 102 may have determined that two objects, one including the first polygon of act 202 and another including the second polygon of act 204, have passed this trivial reject phase and thus are candidates for further collision detection testing. Details about the various methods of undertaking the trivial reject phase of a collision detection process are beyond the scope of the claimed invention and are well known in the art.

Process 200 may also include the generation of a texture map storing distance values [act 206]. In accordance with some implementations of the invention act 206 may be undertaken by application software in a preprocessing phase occurring prior to any other steps in process 200. In other implementations of the invention act 206 may be undertaken by application software in run time concurrent with other acts of process 200. Regardless, the invention is not limited by when act 206 is undertaken.

Figure 3:
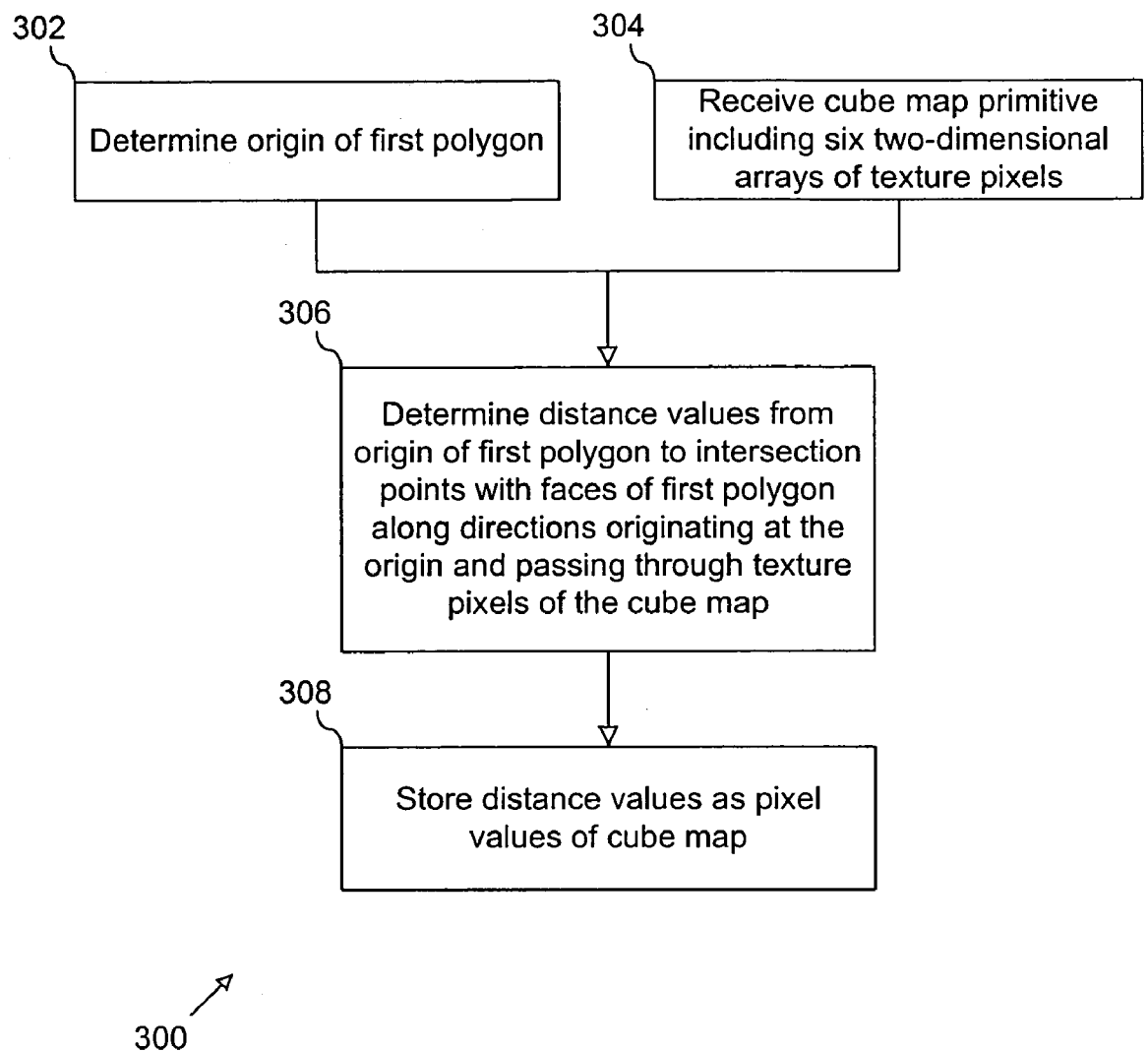
FIG. 3 is a flow chart illustrating a process in accordance with some implementations of the invention.

FIG. 3 is a flow chart illustrating a process 300 that may, in accordance with some implementations of the invention, be undertaken to generate a texture map storing distance values in accordance with act 206 of process 200. While, for ease of explanation, process 300 may be described with regard to engine 100 of FIG. 1, the claimed invention is not limited in this regard and other processes or schemes supported by appropriate devices in accordance with the claimed invention are possible.

Figure 4:
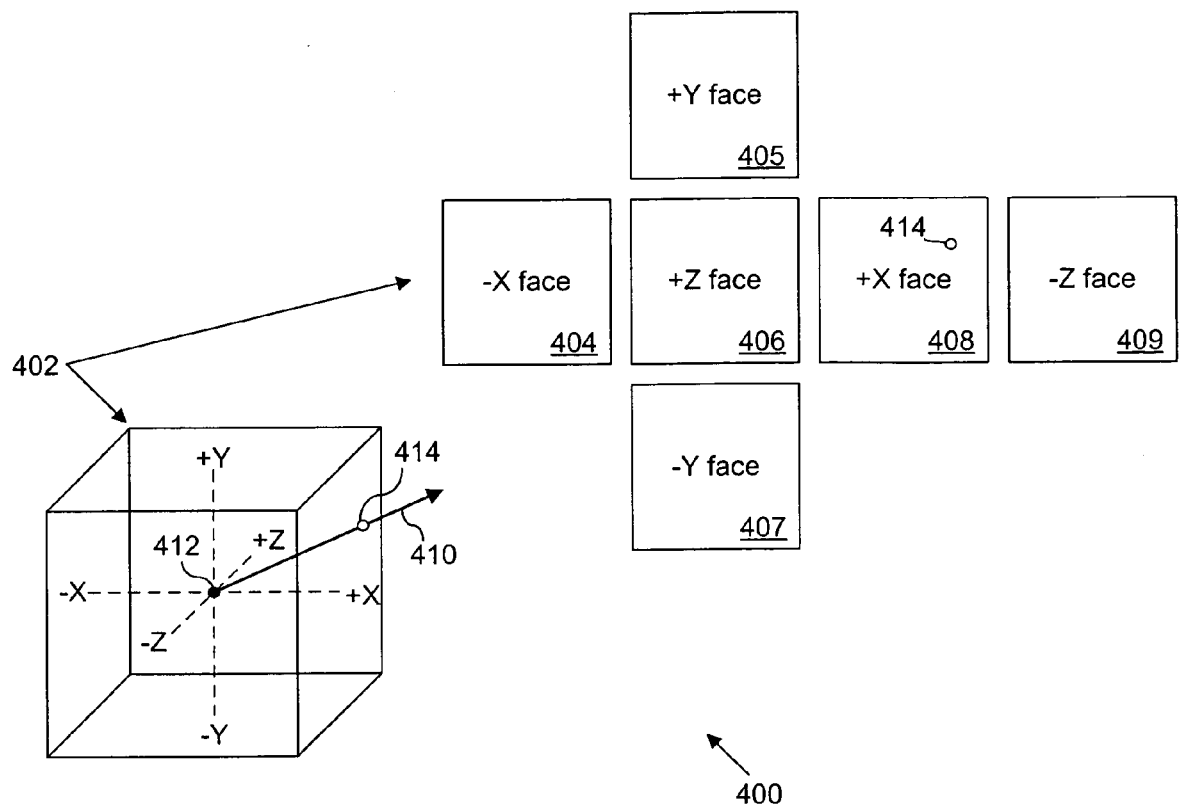
FIGS. 4-7 illustrate example schemes useful for discussing the processes of FIGS. 2 and 3.

FIG. 4 illustrates a representative cube map labeling scheme 400 that, while aiding discussion of process 300 and/or related processes, should not be construed to limit the claimed invention in anyway. Scheme 400 shows a 3D cube map primitive 402 that, as those skilled in the art will recognize, may correspond to standard cube map primitives as defined by well known 3D graphics applications such as, for example, DirectX, although the invention is not limited to a particular cube map primitive. Map 402 may be composed of six two-dimensional (2D) texture maps 404-409 arranged as the faces of a cube wherein each one of maps 404-409 may comprise an eight-by-eight array of pixels and wherein each pixel of maps 404-409 may be capable of storing floating point distance values as will be explained in greater detail below. The invention is not, however, limited to particular resolutions of maps 404-409 nor is the invention limited to the data type stored at pixel locations in maps 404-409. Moreover, those skilled in the art will recognize that each of 2D maps 404-409 of 3D cube map 402 may be treated as a lookup table of values that may be accessed by using indexes specifying particular pixels of maps 404-409.

As those skilled in the art will recognize, coordinates for each pixel of 2D maps 404-409 may be indexed by a 3D direction vector 410 originating at an origin 412 of cube map 402. In some implementations of the invention origin 412 may correspond to the centroid of an object such as a polygon as will be explained in further detail below. The invention is not, however, limited to how origin 412 is defined and thus, for example, origin 412 may comprise the circumcenter of an object. Those skilled in the art will further recognize that a set of unique direction vectors may be defined such that each vector of the set of vectors passes through a corresponding pixel of one of 2D maps 404-409. For example, vector 410 passes through a pixel 414 of map 408, where map 408 corresponds to a +X face of cube map 402 and where pixel 414 may correspond to a specific (u,v) texture coordinate pair of map 402. Thus, vector 410 may be defined by origin 412 and the texture coordinate pair corresponding to pixel 414.

In accordance with some implementations of the invention, origin 412 may be the centroid of an object or the circumcenter of an object. However, the invention is not limited in this regard and, thus, origin 412 may comprise any point lying inside an object. Moreover, while the texture primitive employed in processes 200 and 300 may comprise a cube map primitive the invention is not limited in this regard and, thus, for example, processes 200 and 300 may be undertaken using other 3D texture primitives such as texture primitives employing more than six 2D faces or, for example, paraboloid or spherical texture primitives.

Figure 5:
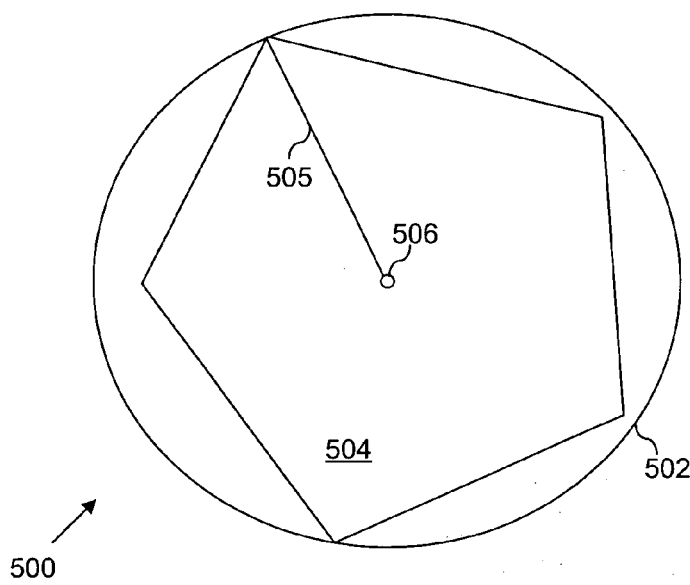

Process 300 may begin with the determination of an origin of the first polygon [act 302] where that polygon is the same polygon as that received in act 202 of process 200. Those skilled in the art will recognize the well known technique of determining a bounding sphere of a polygon as one way to determine an origin of a polygon in accordance with act 302. For the sake of discussion, FIG. 5 illustrates a scheme 500 for determining a bounding sphere in accordance with some implementations of act 302. While, for the purposes of illustration, FIG. 5 illustrates bounding sphere 502 and an associated polygon 504 in 2D, implementations of act 302 may be undertaken on a 3D polygon resulting in a 3D bounding sphere.

Those skilled in the art will recognize that bounding sphere 502 represents a hypothetical sphere that encompasses polygon 504 such that the scalar radius 505 of sphere 502 defines a maximum distance from the center 506 of the sphere to any point of polygon 504. When so defined, the center 506 of sphere 502 represents the centroid of polygon 504. Thus, as a result of act 302 an origin such as a centroid of the first polygon may be determined. As noted above, however, the invention is not limited to how the origin of an object is determined or defined. Thus, in accordance with the invention, any arbitrary means could be used to determine the origin of a 3D object to be processed by process 300.

Process 300 may continue with the receipt of a cube map primitive [act 304] where that primitive comprises six 2D arrays of texture pixels. As discussed above, cube maps are a well known type of 3D graphics primitive. Process 300 may then continue with the determination of distance values from the origin of the first polygon to intersection points with faces of the first polygon along directions originating at the origin and passing through pixels of the cube map [act 306].

Figure 6:
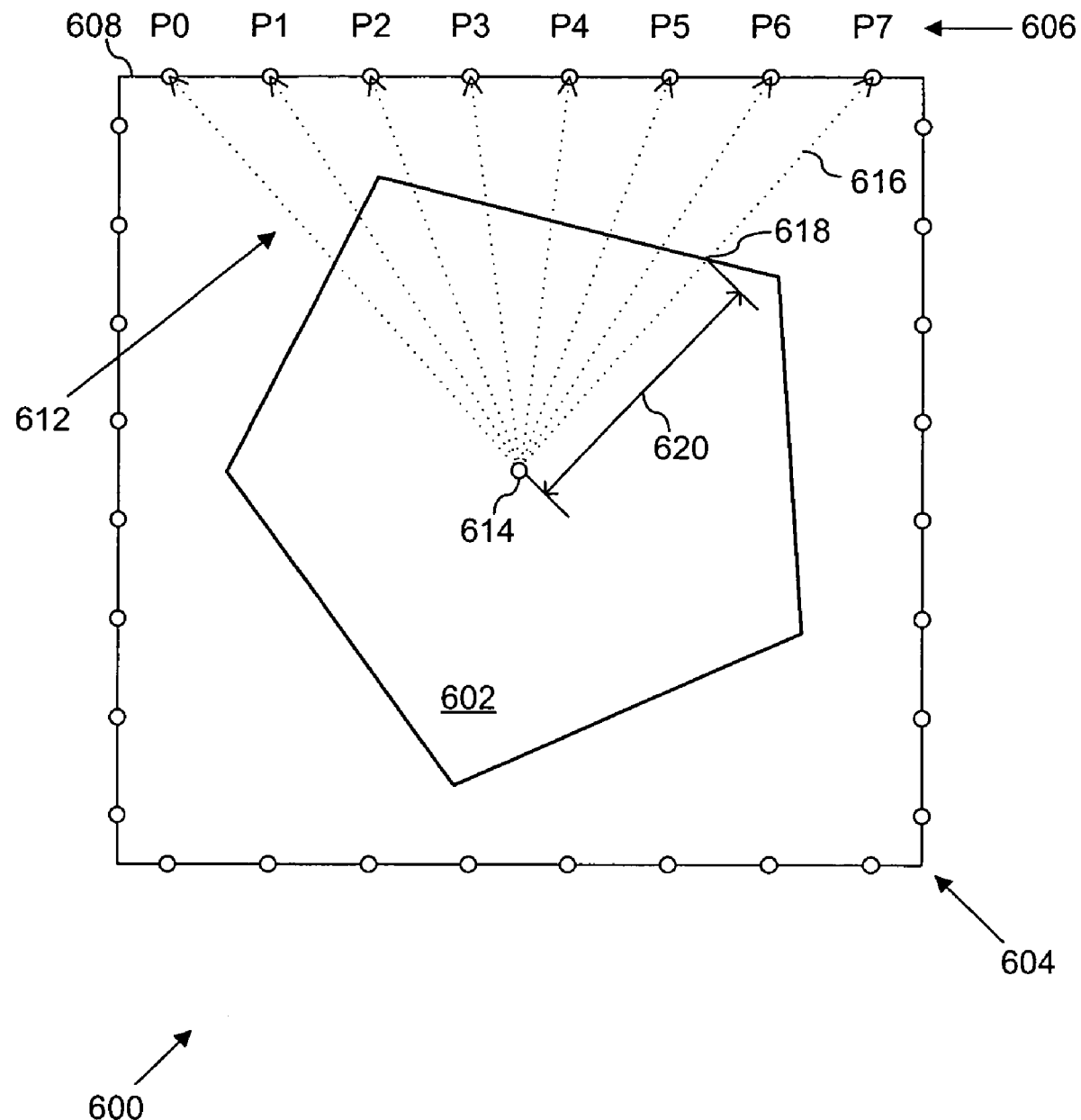

FIG. 6 illustrates a scheme 600 for determining distance values in accordance with some implementations of act 306. FIG. 6 shows a 2D cross-section of a polygon 602 and a cube map 604. While, for the purposes of illustration, FIG. 6 illustrates a 2D cross-section of polygon 602 and map 604, implementations of act 306 may be undertaken on a 3D polygon resulting in a determination of distance values with respect to a 3D cube map. FIG. 6 shows one row 606 of pixels P1-P7 of one face 608 of map 604 where, in accordance with some implementations of act 306, distance values may be determined along eight unique directions 612 where each of directions 612 begins at an origin 614 of polygon 602 and passes through a separate one of pixels 606. Thus, for example, a direction 616 passing through pixel P7 has an intersection 618 with a face of polygon 602 and a distance value 620 defined as the distance in texture space units between origin 614 and the location of pixel P7. In a similar manner, distance values in accordance with act 306 may be determined for all directions 612 in FIG. 6 as well as for all other directions (not shown) for the remaining pixels of cube map 604.

While FIG. 6 shows a cross-section of a cube map 604 where each face of map 604 may comprise an eight-by-eight array of pixels so that cube map 604 may include a total of 144 pixels, the invention is not limited to a particular resolution of cube map employed in processes 200 and 300. Thus, for example, act 306 may be undertaken with different resolution cube maps for each polygon processed in process 300. For example, the cube map received in act 302 may comprise six 2D sixteen-by-sixteen pixel arrays so that the cube map employed in processes 200 and 300 may include a total of 1,536 pixels. Alternatively, the cube map received in act 302 may comprise six 2D four-by-four pixel arrays so that the cube map employed in processes 200 and 300 may include a total of 96 pixels. Moreover, those skilled in the art will recognize that act 306 may be undertaken by determining distance values along only a subset of directions (e.g., only a subset of directions 612) with the remaining distance values determined by linear interpolation between pairs of the distance values determined in act 306.

Process 300 may continue with the storing of the distance values as pixel values of the cube map [act 308]. In accordance with some implementations of the invention, act 308 may involve storing each distance value determined in act 306 as the pixel value of the pixel lying along the direction associated with that distance value. For example, if act 306 includes determining distance value 620 associated with direction 616, then act 308 may involve storing distance value 620 as the pixel value of pixel P7 lying along direction 616. In some implementations of the invention those distance values determined in act 306 and stored in act 308 may comprise floating point values although the invention is not limited to the distance values having a particular data format.

Moreover, while the detailed description provided herein refers to convex polygons, such as polygon 504 or polygon 602, the invention is not limited in this regard and concave polygons may be employed in processes 200/300. Those skilled in the art will recognize that a convex polygon may be defined as an object wherein any whole straight line segment joining any two points of the object is contained wholly within the object while a concave polygon may be defined as an object wherein a whole straight line segment joining two points of the object may be found in which that line segment is not completely contained in the object.

To employ concave polygons in processes 200/300 a bounding volume corresponding to a convex hull of a concave polygon may be determined where that convex hull bounding volume has a scalar radius corresponding to the greatest distance value between an origin of the object and any point of the object. Such a convex hull bounding volume may then be employed in act 302. Alternatively, convex decomposition techniques may be used to subdivide a concave geometry into smaller convex geometries. The processes 200/300 may then be employed to detect collisions between those convex sub-geometries. Both convex hull bounding volume and convex decomposition techniques are well known in the art and will not be discussed in greater detail herein.

Referring again to process 200, in some implementations of the invention an application, such as a 3D graphics application, may undertake all acts of process 300 in a preprocessing stage (i.e., before process 200 is undertaken) and supply the resulting texture map to algorithm 102 in act 206. Alternatively, in other implementations of the invention, algorithm 102 may undertake process 300 in a dynamic manner in response to each collision detection event occurring during 3D rendering implemented by engine 100. Further, for each polygon received in act 202 an associated cube map storing distance values for that polygon may have been created in process 300 (i.e., generated in act 206) and used in further acts of process 300 as will be explained in greater detail below. In accordance with some implementations of the invention, process 300 may result in a cube map being held or stored in memory 106 where that cube map stores distance values for a particular polygon.

Figure 7:
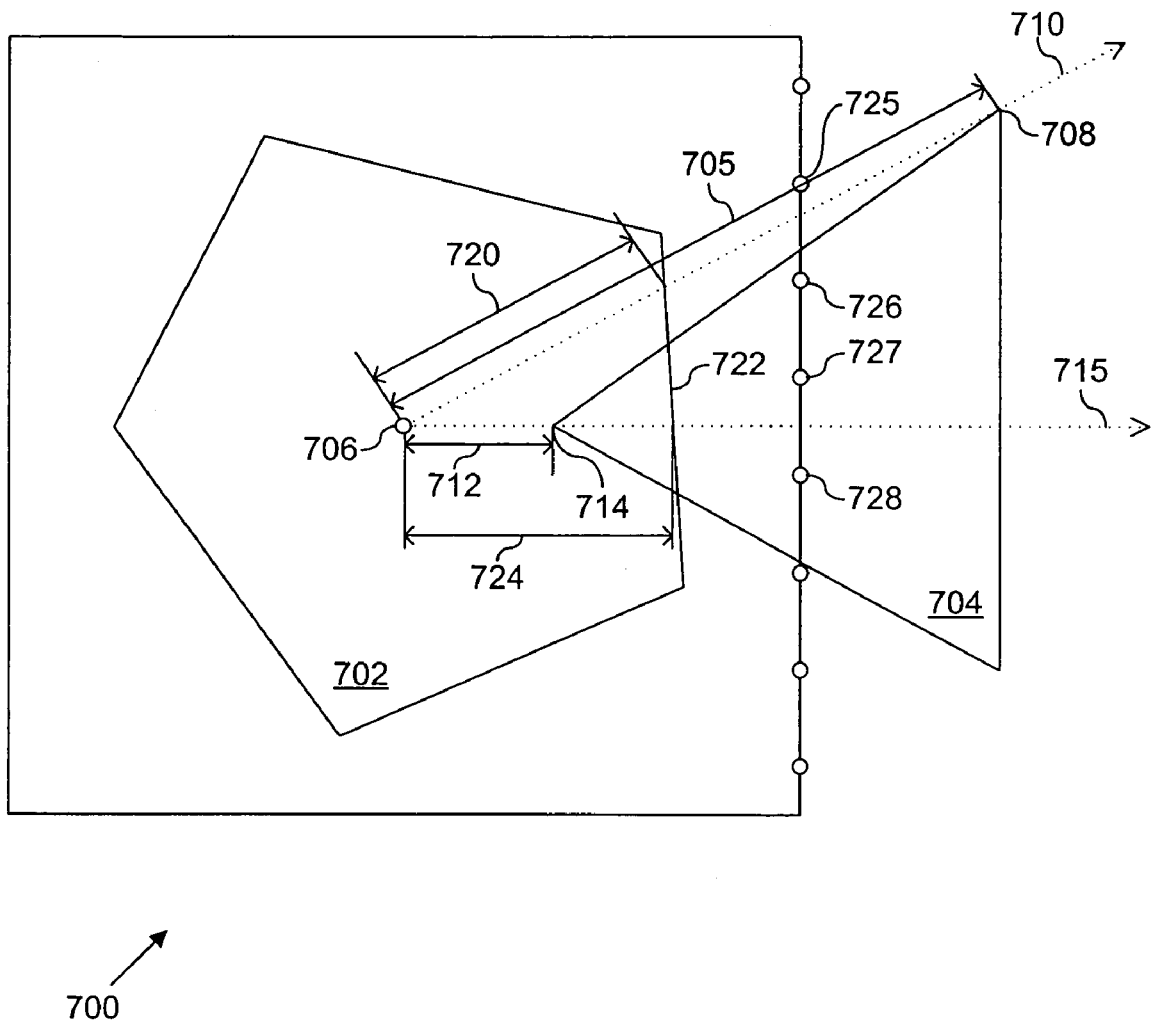

Process 200 may continue with determining a first distance value from an origin of the first polygon to a vertex of the second polygon [act 208] where the first distance lies along a direction vector extending from the origin of the first polygon to a vertex of the second polygon. FIG. 7 illustrates a scheme 700 for determining a first distance value in accordance with some implementations of act 208.

FIG. 7 shows a first polygon 702 and a second polygon 704 where, in accordance with some implementations of act 208, a first distance value 705 may be determined between an origin 706 of polygon 702 and a vertex 708 of polygon 704 along a direction vector 710 originating at origin 706 and passing through vertex 708. Similarly, for example, act 208 may comprise determining a first distance value 712 between origin 706 and a vertex 714 of polygon 704 along a direction vector 715 originating at origin 706 and passing through vertex 714. While, for the purposes of illustration, FIG. 7 illustrates a 2D cross-section of polygons 702 and 704, implementations of act 208 may be undertaken with respect to 3D polygons resulting in a determination of a first distance value along a direction vector defined by 3D coordinates. In some implementations of the invention, act 208 may be undertaken by algorithm 102 after receiving the first and second polygons in respective acts 202 and 204.

Process 200 may then continue with the determination, along a direction vector, of a second distance from the origin of the first polygon to a face of the first polygon by performing one or more lookups to a texture map [act 210]. In some implementations of the invention, referring again to FIG. 7, act 210 may involve determining, for example, a second distance 720 from origin 706 to a face 722 of polygon 702 along direction vector 710. In this example, determining second distance 720 may involve looking up the distance values (i.e., determined in 306) that are stored at pixels 725 and 726 (i.e., in act 308) of the texture map generated in act 206 and then linearly interpolating between those distance values to obtain second distance 720 in act 210.

Similarly, for example, act 210 may involve determining a second distance 724 from origin 706 to face 722 of polygon 702 along direction vector 715. Then, in this example, determining second distance 724 may involve looking up the distance values that are stored at pixels 727 and 728 of the texture map generated in act 206 and then linearly interpolating between those distance values to obtain second distance 724 in act 210. In some implementations of the invention, act 210 may involve algorithm 102 providing texture sampler 104 with lookup indices associated with the pixels (e.g., pixels 725 and 726 or pixels 727 and 728). Sampler 104 may then use those indices to generate corresponding memory addresses for accessing the distance values for the corresponding pixels of the cube map stored in memory 106. Sampler 104 may then linearly interpolate between those distance values and provide a resulting interpolated distance value to algorithm 102. Alternatively, Sampler 104 may provide the distance values to algorithm 102 and algorithm 102 may linearly interpolate between those values to determine the second distance in act 210.

While each of direction vectors 710 and 715 are shown in FIG. 7 as passing through or specifying a texture coordinate pair lying, respectively, between pixels 725 and 726 and pixels 727 and 728, the invention is not limited to the 2D representation shown in FIG. 7. Thus, for example, either of direction vectors 710 and 715 may pass through or specify a texture coordinate pair lying between two pixel rows or columns of a face of a cube map. Thus, act 210 may involve using four lookup indices to access the distance values stored at the four pixels that bound that texture coordinate pair and then bi-linearly interpolating between those four distance values to obtain the second distance value. The invention is not, however, limited to linear interpolation (bi-linear, tri-linear or otherwise). Thus, for example, act 210 may be undertaken using nearest point sampling of the distance values obtained from the texture map.

In other implementations of the invention, act 210 may involve algorithm 102 providing pixel shader 108 with lookup indices associated with the pixels (e.g., pixels 725 and 726 or pixels 727 and 728) and shader 108 may convey those indices to texture sampler 104. Sampler 104 may then use those indices to generate corresponding memory addresses for accessing the distance values for the corresponding pixels of the cube map stored in memory 106 and provide those distance values to shader 108. Shader 108 may then linearly interpolate between those distance values and provide a resulting interpolated distance value to algorithm 102. Alternatively, Shader 108 may provide the distance values to algorithm 102 and algorithm 102 may linearly interpolate between those values to determine the second distance in act 210.

Process 200 may then continue with comparing the first distance value to the second distance value [act 212] and, if the second distance is greater than or equal to the first distance, detecting a collision [act 216] between the first and second polygons. Referring again to FIG. 7, act 212 may, for example, involve comparing the first distance 705 to the second distance 720 along direction vector 710. In this case first distance 705 is greater than second distance 720 and no collision will be detected. However, act 212 may, for another example, involve comparing the first distance 712 to the second distance 724 along direction vector 715. In this case second distance 724 is greater than first distance 712 and thus a collision may be detected in act 216. In some implementations of the invention algorithm 102 may undertake the comparison of act 212 and determine, in act 216 that a collision has occurred if the second distance is greater than or equal to the first distance.

While acts 208 and 210 as described above refer, respectively, to determining first and second distances, and while act 212 refers to comparing these two distances to each other, in other implementations of the invention process 200 may include the acts of determining the square of those distances and then comparing those squared distance values to each other in act 212. Thus, in these implementations, act 214 may comprise determining if the square of the second distance is greater than or equal to the square of the first distance. The invention is, however, not limited to comparing the distances or the square of the distances in act 212. Thus for example, process 200 may include the acts of determining the square root of those distances and then comparing those square root distance values to each other in act 212.

The acts shown in FIGS. 2 and 3 need not be implemented in the order shown; nor do all of the acts necessarily need to be performed. Also, those acts that are not dependent on other acts may be performed in parallel with the other acts. For example, acts 202 and 204 may be undertaken in parallel. Alternatively, acts 202 and 204 may be combined into a single action. In other words, the receipt of first and second polygons may take place in a single action. In addition, as noted above, act 206, the generation of a cube map in accordance with some implementations of the invention, may take place prior to all other acts of process 200 or, alternatively, act 206 may take place after or in parallel with acts 202 or 204. Further, at least some of the acts in this figure may be implemented as instructions, or groups of instructions, implemented in a machine-readable medium.

In some implementations of the invention, algorithm 102 as employed in processes 200 and/or 300 may comprise the following pseudo code:

```
Collision_Detection_Using_Cubemaps(...)
bool Collision = false;
Foreach vertex V_{2,j} of polygon P_2 {
    DirectionVector = V_{2,j} - C_1;
    d1 = texCube (DirectionVector);
    d2 = distance (C_1, V_{2,j});
    if (d1 >= d2) {
        Collision = true;
        break; // Collision
    }
}
If (Collision) {
    // Model the response of collision
} else {
    // No collision, move on to evaluate the collision
    detection for next pair of geometries
}
```

In other implementations of the invention, algorithm 102 as employed in processes 200 and/or 300 may be spawned by or be associated with pixel shader 108 of engine 100 and may comprise the following high level shading language (HLSL) pixel shader code:

```
PS_OUTPUT CollisionDetectionPS( VS_OUTPUT In,
                uniform bool bTexture )
{
    PS_OUTPUT Output;
    int Index = 0;
    float sum = 0.0;
    float fActualDist,fCubeMapDist;
    float4 temp = (0,0,0,1);
    float4 WorldPos,WorldCentroid,dir;
    bool collision = false;
    float2 tex;
    //bool results[115];
    int trouble = 0;
    Output.RGBColor.r = Output.RGBColor.g = Output.RGBColor.b =
Output.RGBColor.a = 0.0;
    // These are texture (u,v) coordinates used to index at
    center of pixels, and access // the position data of
    objects.
    float disp = 0.5/g_iNumVertices[1];
    tex.y = 0.5
    // World position of Centroid of object 0
```

-continued

```
    WorldCentroid = mul(g__vCentroids[0],g__mWorldMat0);
    // Shoot rays thru' all the vertices of Object 1
    for( Index = 0; Index < g__iNumVertices[1]; Index++ ) {
        tex.x = Index/g__iNumVertices[1] + disp;
        // Get the position of vertex of object 1 that is
stored in a texture.
        WorldPos = tex2D(g__samPositions1,tex);
        // Tranform to world space.
        WorldPos = mul(WorldPos,g__mWorldMat1);
        dir = WorldPos − WorldCentroid;
        fActualDist = sqrt(dir.x*dir.x + dir.y*dir.y +
dir.z*dir.z);
        // Transform the direction back to the space where
cube-map was generated by
        // multiplying by inverse of world matrix for object 0.
        dir = mul(dir,g__mWorldMat0Inv);
        dir = normalize(dir);
        temp = texCUBE(g__samCubeMapDistance0,dir);
        fCubeMapDist = temp.x;
        if (fCubeMapDist > fActualDist) {
            collision = true;
        }
    }
    // Do the same calculations as above but switching the
objects. So now cycle thru' object 0's vertices.
    disp = 0.5/g__iNumVertices[0];
    WorldCentroid = mul(g__vCentroids[1],g__mWorldMat1);
    for( Index = 0; Index < g__iNumVertices[0]; Index++ ) {
        tex.x = Index/14.0 + disp;
        WorldPos = tex2D(g__samPositions0,tex);
        WorldPos = mul(WorldPos,g__mWorldMat0);
        dir = WorldPos − WorldCentroid;
        fActualDist = sqrt(dir.x*dir.x + dir.y*dir.y +
dir.z*dir.z);
        dir = mul(dir,g__mWorldMat1Inv);
        dir = normalize(dir);
        temp = texCUBE(g__samCubeMapDistance1,dir);
        fCubeMapDist = temp.x;
        if (fCubeMapDist > fActualDist) {
            collision = true;
        }
    }
    if (collision == true) {
        Output.RGBColor.r = Output.RGBColor.g =
Output.RGBColor.b = 1.0;
        Output.RGBColor.a = 1.0;
    }
    return Output;
}
```

Figure 8:
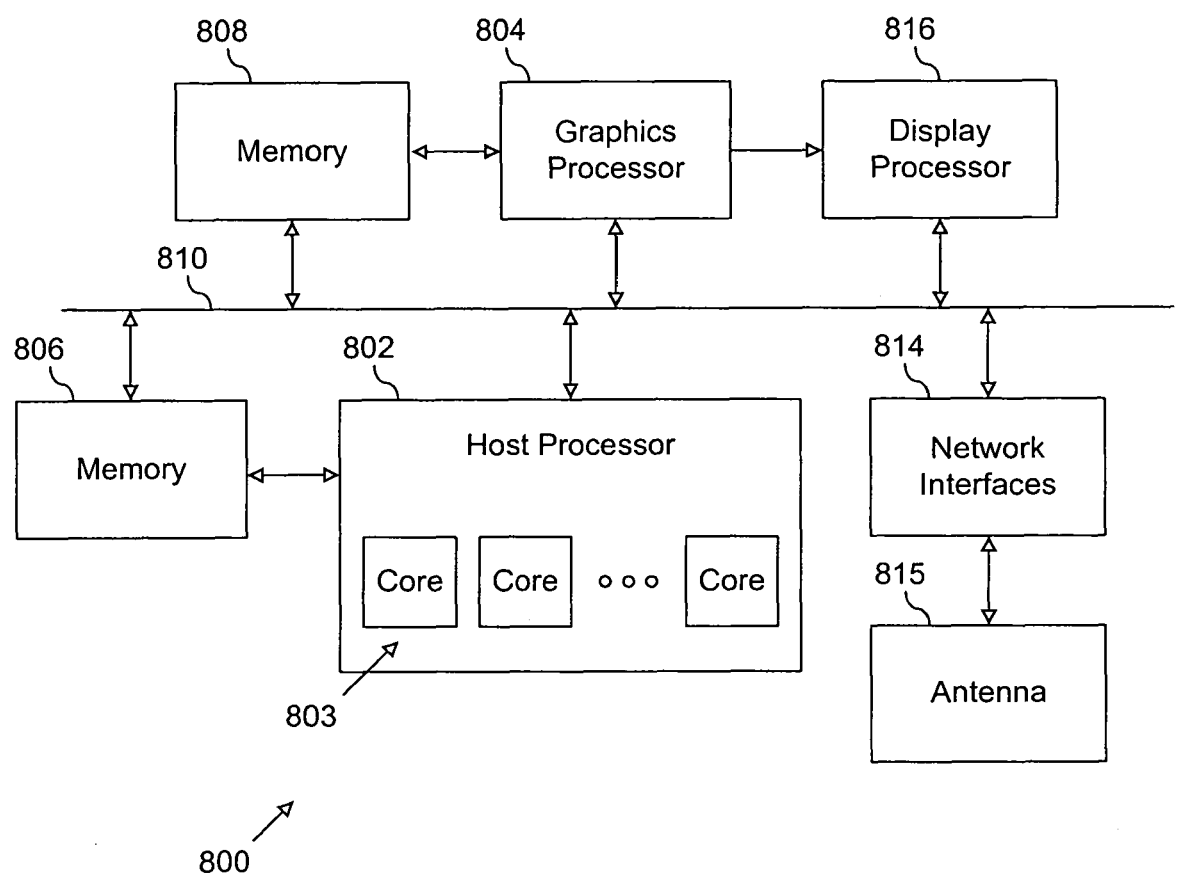
FIG. 8 illustrates a system in accordance with some implementations of the invention.

FIG. 8 illustrates an example system 800 in accordance with some implementations of the invention. System 500 may include a host processor 802 having two or more processing cores 803, a graphics processor 804, memories 806 and 808 (e.g., dynamic random access memory (DRAM), static random access memory (SRAM), non-volatile memory, etc.), a bus or communications pathway(s) 810, network interfaces 814 (e.g., wired and/or wireless local area network (LAN) and/or wide area network (WAN) and/or personal area network (PAN), and/or other wired and/or wireless network interfaces), and a display processor and/or controller 816. System 800 may also include an antenna 815 (e.g., dipole antenna, narrowband Meander Line Antenna (MLA), wideband MLA, inverted "F" antenna, planar inverted "F" antenna, Goubau antenna, Patch antenna, etc.) coupled to network interfaces 814. System 800 may be any system suitable for processing 3D graphics data and providing that data in a rasterized format suitable for presentation on a display device (not shown) such as a liquid crystal display (LCD), or a cathode ray tube (CRT) display to name a few examples.

System 800 may assume a variety of physical implementations. For example, system 800 may be implemented in a personal computer (PC), a networked PC, a server computing system, a handheld computing platform (e.g., a personal digital assistant (PDA)), a gaming system (portable or otherwise), a 3D capable cellular telephone handset, etc. Moreover, while all components of system 800 may be implemented within a single device, such as a system-on-a-chip (SOC) integrated circuit (IC), components of system 800 may also be distributed across multiple ICs or devices. For example, host processor 802 along with components 806 and 814 may be implemented as multiple ICs contained within a single PC while graphics processor 804 and components 808 and 816 may be implemented in a separate device such as a television or other display coupled to host processor 802 and components 806 and 814 through communications pathway 810.

Host processor 802 may comprise a special purpose or a general purpose processor including any control and/or processing logic, hardware, software and/or firmware, capable of providing graphics processor 504 with 3D graphics data and/or instructions. Processor 802 may perform a variety of 3D graphics calculations such as 3D coordinate transformations, etc. the results of which may be provided to graphics processor 804 over bus 810 and/or that may be stored in memories 806 and/or 808 for eventual use by processor 804. In some implementations of the invention host processor 802 may be a Central Processing Unit (CPU).

In one implementation, host processor 802 may be capable of performing any of a number of tasks that support or enable real-time, multi-resolution 3D collision detection using cube maps. Support tasks may include, for example, although the invention is not limited in this regard, providing 3D graphics data to graphics processor 804, placing one or more texture maps, such as cube maps, in memory 808, downloading microcode (via antenna 815 and interfaces 814) to processor 804, initializing and/or configuring registers within processor 804, interrupt servicing, and providing a bus interface for uploading and/or downloading 3D graphics data. In alternate implementations, some or all of these functions may be performed by graphics processor 804. While FIG. 5 shows host processor 802 and graphics processor 804 as distinct components, the invention is not limited in this regard and those of skill in the art will recognize that processors 802 and 804 possibly in addition to other components of system 800 may be implemented within a single IC.

In accordance with some implementations of the invention, each of cores 803 may perform, in parallel, processes 200/300 for separate pairs of polygons using separate implementations of collision detection algorithm 102. Alternatively, such parallel processing schemes may be implemented by graphics processor 804.

Graphics processor 804 may comprise any processing logic, hardware, software, and/or firmware, capable of processing graphics data. In one implementation, graphics processor 804 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 804 may process 3D graphics data provided by host processor 802, held or stored in memories 806 and/or 808, and/or provided by sources external to system 800 and obtained over bus 810 from interfaces 814.

Graphics processor 804 may receive 3D graphics data in the form of 3D scene data and process that data to provide image data in a format suitable for conversion by display processor 816 into display-specific data. In addition, graphics processor 804 may implement a variety of 3D graphics processing components and/or stages (not shown) such as a rasterizer stage in addition to one or more texture samplers similar to texture sampler 104. Texture samplers implemented by graphics processor 804 may fetch or access texture data stored or held in the form of cube maps in either or both of memories 806 and 808. Further, in accordance with some implementations of the invention, graphics processor 804 may implement two or more texture samplers capable of using distance values stored in one or more cube maps to undertake collision detection for multiple pairs of polygons in a parallel fashion.

Bus or communications pathway(s) 810 may comprise any mechanism for conveying information (e.g., graphics data, instructions, etc.) between or amongst any of the elements of system 800. For example, although the invention is not limited in this regard, communications pathway(s) 810 may comprise a multipurpose bus capable of conveying, for example, instructions (e.g., macrocode) between processor 802 and processor 804. Alternatively, pathway(s) 810 may comprise a wireless communications pathway.

Display processor 816 may comprise any processing logic, hardware, software, and/or firmware, capable of converting rasterized image data supplied by graphics processor 804 into a format suitable for driving a display (i.e., display-specific data). For example, while the invention is not limited in this regard, processor 804 may provide image data to processor 816 in a specific color data format, for example in a compressed red-green-blue (RGB) format, and processor 816 may process such RGB data by generating, for example, corresponding LCD drive data levels etc. Although FIG. 8 shows processors 804 and 816 as distinct components, the invention is not limited in this regard, and those of skill in the art will recognize that, for example, some if not all of the functions of display processor 816 may be performed by graphics processor 804 and/or host processor 802.

Thus, by taking advantage of hardware primitives such as cube maps a collision detection algorithm in accordance with the invention may execute entirely on a graphics processor such as processor 804 with, possibly, the exception of the preprocessing of process 300 which may be implemented once for each polygon and done ahead of process 200. Further, a collision detection algorithm in accordance with the invention can leverage a high level octree structure to minimize object-object detections and may rely on cube maps for those object-object interactions that are identified as candidates by the octree data structure. Thus, by moving the collision detection algorithm to a graphics processor (e.g., processor 804) the CPU (e.g., host processor 802) may be freed up to undertake other tasks. Although a collision detection algorithm in accordance with the invention may execute on a CPU as well. Moreover, using hardware primitives such as cube maps to detect collisions may result in a significant reduction of the arithmetic operations per collision (possibly as much as a three-fold reduction) and is amenable to a many processing core implementation (e.g., using cores 803) due to the capability of performing completely independent collision detection tests.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 1 and the accompanying text may show and describe a single texture sampler 104 coupled to a single texture memory 106, those skilled in the art will recognize that data processors in accordance with the invention may include rendering engines that employ multiple texture samplers, each operating in accordance with the invention, coupled to one or more texture memories. Clearly, many other implementations may be employed to provide for real-time, multi-resolution 3D collision detection using cube maps in accordance with the invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An article comprising a non-transitory machine-accessible medium having stored thereon instructions that, when executed by a machine, cause the machine to:
   determine a first distance from an origin of a first polygon to a vertex of a second polygon along a direction vector;
   determine, along the direction vector, a second distance from the origin of the first polygon to a face of the first polygon using a third distance to a first point above the intersection of said direction vector with a cube map for said first polygon and a fourth distance to a second point below said intersection of said distance vector with said cube map and interpolating said third and fourth distances to obtain said second distance, said cube map having six faces stored as six square textures and generated by rendering a scene six times from a viewpoint, with the views defined by an orthogonal ninety degree view frustrum representing each cube face;
   compare the first and second distances; and
   detect a collision between the first and second polygons if the second distance is greater than or equal to the first distance.

2. The article of claim 1, wherein said cube map storing distances between an origin of the first polygon and all faces of the first polygon.

3. The article of claim 1, wherein the origin of the first polygon is one of the centroid of a bounding sphere of the first polygon or the circumcenter of the first polygon.

4. The article of claim 1, wherein the instructions to use the cube map to detect collisions between the first and second polygons when executed by a machine, cause the machine to:
   determine the first distance corresponding to a distance from the origin to a vertex of the second polygon, the origin of the first polygon and the vertex of the second polygon defining a direction vector;
   determine, along the direction vector the second distance corresponding to a distance from the origin of the first polygon to a face of the first polygon by employing a lookup to a texture address of the cube map; and
   compare the first distance to the second distance.

5. The article of claim 1, further having stored thereon instructions that, when executed by a machine, cause the machine to:
   generate the cube map by:

determining a centroid of the first polygon;

determining a plurality of distances from the centroid to all faces of the first polygon, wherein each distance of the plurality of distances is determined along a respective vector of a plurality of vectors, each vector of the plurality of vectors originating at the centroid and passing through a respective element of the texture map; and store each distance of the plurality of distances as a value of the respective element of the texture map.

6. An apparatus comprising:

memory to store a cube map, the cube map comprising pixels storing distance values;

texture sampling logic to determine a first distance from an origin of a first polygon to a vertex of a second polygon along a direction vector, determine, along the direction vector, a second distance from the origin of the first polygon to a face of the first polygon using a third distance to a first point above the intersection of said direction vector with a cube map for said first polygon and a fourth distance to a second point below said intersection of said distance vector with said cube map and interpolating said third and fourth distances to obtain said second distance, compare the first and second distances, and detect a collision between the first and second polygons if the second distance is greater than or equal to the first distance, said cube map having six faces stored as six square textures and generated by rendering a scene six times from a viewpoint, with the views defined by an orthogonal ninety degree view frustrum representing each cube face.

7. The apparatus of claim 6, wherein the distance values comprise distances between an origin of a first polygon and faces of the first polygon.

8. The apparatus of claim 7, wherein the collision detection algorithm determines the one or more lookup indices by determining a direction vector from origin of the first polygon to a vertex of the second polygon, the direction vector specifying a coordinate pair of the cube map, the one or more lookup indices specifying the texture coordinates of one or more cube map pixels surrounding the coordinate pair of the cube map specified by the direction vector.

9. The apparatus of claim 6, wherein the memory comprises one of dynamic random access memory (DRAM), static random access memory (SRAM), or non-volatile memory.

10. The apparatus of claim 6, further comprising an antenna to receive the collision detection algorithm.

11. The apparatus of claim 10, wherein the antenna comprises one of a dipole antenna, a narrowband Meander Line Antenna (MLA), a wideband MLA, an inverted "F" antenna, a planar inverted "F" antenna, a Goubau antenna, or a Patch antenna.

\* \* \* \* \*